R. C. WOODBURN.
HEATER FOR SAD IRONS.
APPLICATION FILED JUNE 5, 1915.
1,201,905. Patented Oct. 17, 1916.
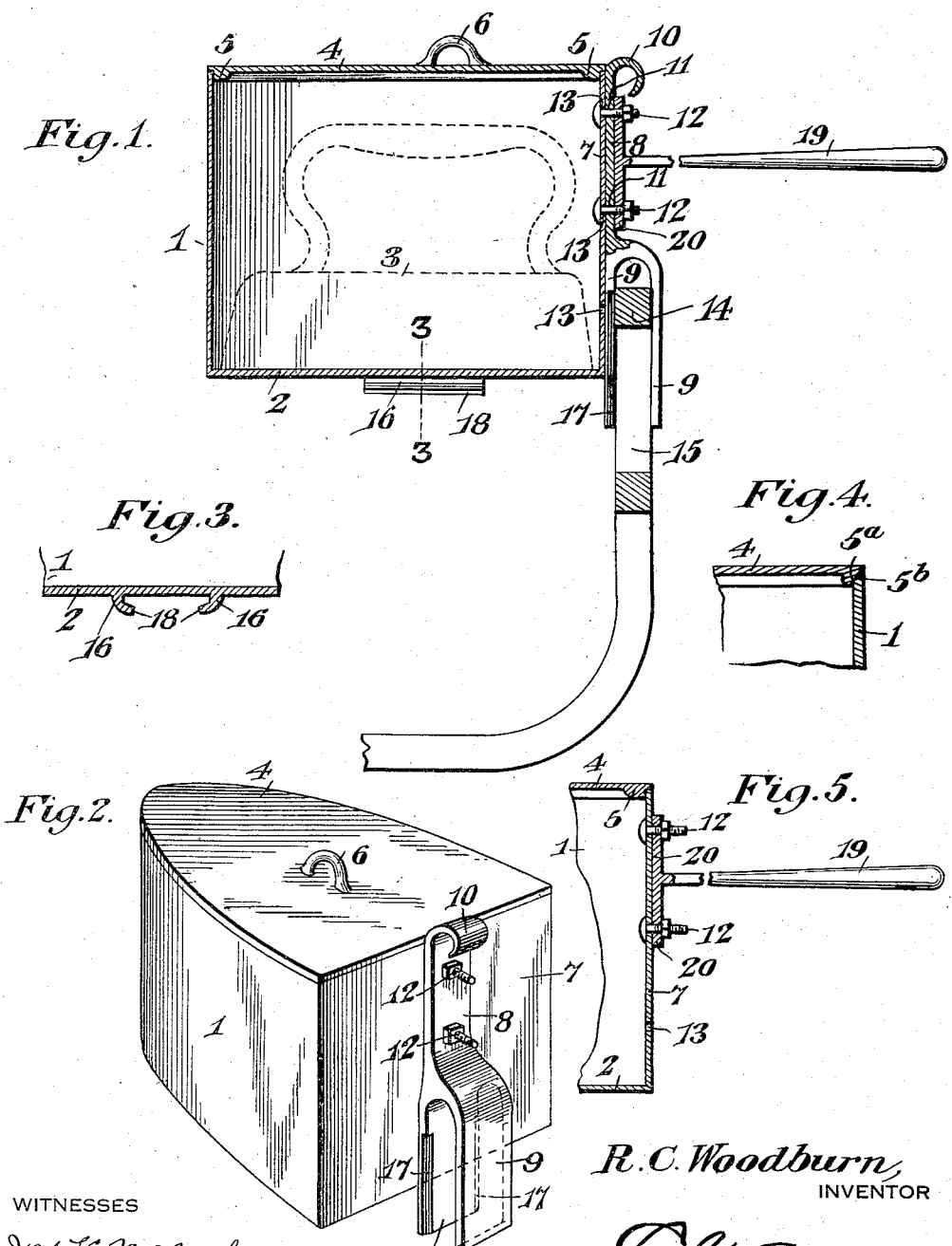
WITNESSES
Jas. K. McCathran
F. T. Chapman
R. C. Woodburn,
INVENTOR
BY E. G. Siggers
ATTORNEY

UNITED STATES PATENT OFFICE.

RODDY C. WOODBURN, OF GREENSBORO, NORTH CAROLINA.

HEATER FOR SAD-IRONS.

1,201,905.  Specification of Letters Patent.  Patented Oct. 17, 1916.

Application filed June 5, 1915. Serial No. 32,414.

*To all whom it may concern:*

Be it known that I, RODDY C. WOODBURN, a citizen of the United States, residing at Greensboro, in the county of Guilford and State of North Carolina, have invented a new and useful Heater for Sad-Irons, of which the following is a specification.

This invention has reference to heaters for sad irons, and its object is to provide a container for sad irons which may be applied to an ordinary grate, whereby the sad iron is readily heated by means of burning fuel within the grate whatever be the nature of such fuel.

In accordance with the present invention there is provided a casing of a size to contain one or more sad irons, and this casing has a cover to prevent waste of heat. There is also provided a bracket which may be attached to the casing at different points, and the bracket is shaped for ready application to the basket of an open grate, so that the casing is supported directly over the fire whether the latter be produced by solid, liquid or gaseous fuel.

The invention will be best understood from a consideration of the following detailed description taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a vertical section through a portion of a grate and through the sad iron container of the present invention as applied to the grate. Fig. 2 is a perspective view of the container with the supporting bracket fast thereto, and the handle omitted. Fig. 3 is a section on the line 3—3 of Fig. 1. Fig. 4 is a fragmentary section through the casing and a small portion of the cover showing a different form of the cover where applied to the casing from the form shown in the other figures. Fig. 5 is a fragmentary section through the container with the handle attached but omitting the supporting bracket.

Referring to the drawings, there is shown a casing 1 which may be appropriately formed of cast metal with a bottom 2 preferably of somewhat thicker gage than the sides, though in this respect the thickness of the sides and bottom may be the same or may otherwise vary.

The casing 1 is preferably of general conformity to the shape of an iron to be lodged therein, and if it be desired to heat more than one iron at a time, the casing may be made appropriately larger.

Assuming that the casing is of a size to contain but one sad iron at a time, its cross-sectional area is about the same and its cross-sectional shape conforms generally to the outlines of a sad iron indicated in dotted lines at 3 in Fig. 1. The depth of the casing is such as to not only contain the body of the iron, but the handle thereof when integral with the body of the iron.

In terming the iron a sad iron it is to be understood that the casing may be used for heating other types of irons, wherefore the term sad iron is to be considered as a general term indicative of any kind of iron which may be used.

The top of the casing is open and may be of the same area as the bottom, and there is provided a cover 4 conforming to the shape of the body 1, said cover having a marginal rib 5 spaced a short distance from the edge of the cover to seat within the walls of the casing, so that the cover will remain in place when properly seated. To manipulate the cover it is provided with a handle 6 preferably so arranged as to be readily engaged by a poker or like implement, since the cover is usually too hot for handling otherwise.

Where the casing 1 conforms quite closely to the shape of an ordinary iron, one end is quite broad, which end is indicated at 7, and the other end may be more or less pointed. Adapted to be applied to the broad end 7 is a supporting bracket 8 having one end 9 forked longitudinally and the other end which may be quite flat and alined with one leg of the fork 9 terminates in a hook 10 adapted to receive a poker or other implement, whereby the whole casing is readily lifted from active position or placed therein. That portion of the bracket between the fork 9 and end 10 may be quite flat and comparatively narrow and has spaced passages 11 therethrough for bolts 12 extending through appropriately spaced passages 13 in the wall 7 of the casing 1. In the particular showing of the drawing but two of the passages 13 in the wall 7 are utilized at a time, and there are but two passages 11 in the bracket 8. This permits an adjustment of the bracket 8 with respect to the casing, so that considering the bracket as in fixed position the casing may be adjusted up and down to an extent permitted by the length of the series of passages 13. Ordinarily two adjustments are sufficient and such adjustments are provided for by the three passages 13.

The forked end 9 of the bracket 8 has the legs spaced apart sufficiently and such legs appropriately elongated to embrace the upper bar 14 of a grate basket 15. In such event the bracket 8 may be applied to the grate basket in a manner which will bring the casing 1 over that portion of the grate designed to contain a bed of coals or to have fuel burning therein whatever be the character of the fuel. Sometimes it is desirable that the casing 1 be arranged exterior to the grate, in which case it is simply necessary to lift the casing 1 and bracket 8 from engagement with the upper rail of the grate, and then the casing 1 may be reversed in direction to extend outwardly from the grate with the yoke end 9 embracing the upper rail or bar 14 of the grate. The position then is just the opposite to that shown in Fig. 1.

Extending longitudinally of the bottom wall 2 of the casing 1 are elongated flanges 16 appropriately spaced apart to receive one leg of the yoke 9, which leg is chamfered, as shown at 17, on opposite sides to snugly fit between the flanges 16, the latter having their outer edges turned one toward the other, as indicated at 18, to form overhang flanges adapted to retain the leg of the yoke end of the bracket 8 having the chamfers 17.

Sometimes grates are quite shallow from front to back, and too shallow to permit the arrangement of the casing 1 in the manner shown in Fig. 1; that is, wholly within the grate and setting down to an extent into the grate, in which latter case the casing may be brought into close relation to the bed of burning fuel. With a shallow grate the bracket 8 is applied to the bottom of the casing, this being permitted by the chamfered leg 9 which is introduced between the flanges 16, the bracket being parallel with the bottom of the casing, and then the yoke is applied to the top bar of the grate so that the casing is partly within the grate and partly without the grate.

With the arrangement shown the casing 1 may be placed close to or more distant from the source of heat because of the adjustment provided by the series of passages or holes 13 and an iron placed within the casing with the cover 4 applied to the casing becomes rapidly and uniformly heated, the heating being more rapid and uniform than is the case where the iron is exposed to the air during the heating operation. Moreover, the casing protects the iron from the direct action of flames, or smoke or gases, and hence the iron remains clean during the heating operation. Furthermore, the iron may be heated under conditions where the heating of an iron by the use of an ordinary stove would be out of the question or uneconomical. A relatively small fire in a grate permits the more thorough heating of the iron in less time than would be accomplished by the use of a relatively large fire within a stove or range.

In Fig. 4 the cover 4 is shown as provided with a bevel edge $5^a$ and the casing 1 is shown as provided with a matching bevel edge $5^b$ for holding the cover in place instead of the rib or bead 5 of Fig. 1.

For convenience of manipulation there is provided an extended handle 19 of appropriate shape with a flat head 20 at one end pierced by holes for the passage of the bolts 12, the holes being properly spaced for the purpose. The extended handle 19 may be used in conjunction with the bracket 8 as in Fig. 1, or without the bracket, as in Fig. 5, or the bracket 8 may be used without the handle 19, as in Fig. 2, although the presence of the handle 19 is to be preferred.

What is claimed is:—

1. A heater for irons, comprising a casing of a size and shape to house the iron, and a bracket of yoke formation for application to the top bar of a grate basket, the casing and bracket having coacting means for the attachment of the bracket to one end of the casing or to the bottom thereof, whereby the casing may be supported wholly within the grate or to the top of the grate to be partly within and partly without said grate.

2. A heater for irons, comprising a casing with end and bottom portions and of a size and shape to house an iron, overhanging flanges on the bottom of the grate, and a bracket with one end in the form of a yoke and one leg of the yoke adapted to enter between the overhanging flanges on the bottom of the casing, and the bracket and one end of the casing being coactively formed for securing the bracket to said end of the casing, whereby the casing may be supported wholly within the grate or on top of the latter partly within and partly without the grate.

3. A heater for irons comprising a casing of a size and shape to house the iron and provided with a removable cover and also with elongated overhanging flanges on the bottom, and a bracket having one end in the form of a yoke for application to the top bar of a grate basket with one leg of the yoke adapted to enter between the overhanging flanges on the bottom of the casing.

4. A heater for irons comprising a casing having bottom and side walls with the latter of a height to house the irons, one end wall of the casing having a series of passages therethrough and the bottom of the casing being provided with opposed overhanging flanges, a cover for the casing having a manipulating handle thereon, and a supporting bracket with a manipulating means at one end and a yoke at the other end adapted to engage the top rail of a grate basket with one leg of the yoke shaped to enter between the overhanging flanges on the bottom of the casing, and the bracket being provided with openings matching those in the end wall of the casing for the passage of uniting devices, said bracket being adjustable lengthwise of the series of passages in the casing.

In testimony, that I claim the foregoing as my own, I have hereto affixed my signature in the presence of two witnesses.

RODDY C. WOODBURN.

Witnesses:
S. F. SMITH,
RUBY PREADY.

Copies of this patent may be obtained for five cents each, by addressing the "Commissioner of Patents, Washington, D. C."